F. McLaughlin,
Brush.
No. 98,787.  Patented Jan. 11, 1870.
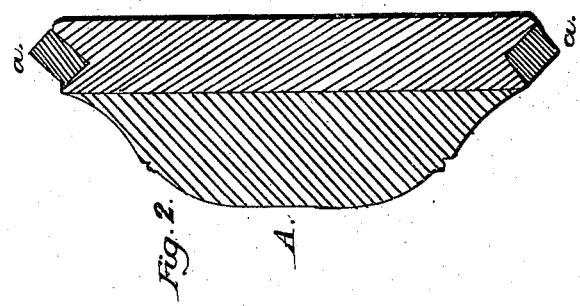
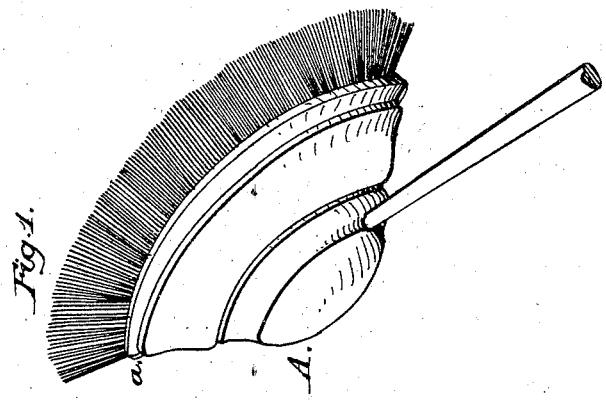
Witnesses:
J. L. Newton
H. T. McLaughlin
Inventor:
Francis McLaughlin

United States Patent Office.

FRANCIS McLAUGHLIN, DECEASED, OF BOSTON, MASSACHUSETTS, (JOHN DWYER, ADMINISTRATOR.)

Letters Patent No. 98,787, dated January 11, 1870.

IMPROVED BRUSH.

The Schedule referred to in these Letters Patent and making part of the same

*To all whom it may concern:*

Be it known that I, FRANCIS McLAUGHLIN, of Boston, in the county of Suffolk, and State of Massachusetts, have invented a new Improvement in Sash-Brushes; and I hereby declare that the following is a full and exact description of the same, reference being had to the accompanying drawings, and to the letters of reference thereon, as parts of this specification, of which—

Figure 1 is a perspective view of the sash-brush.

Figure 2 is a section of the same, showing a section of the rubber band *a*.

The letter A represents the brush, and *a*, the rubber band.

In washing windows, the danger of breaking the glass by the hard substance of the brush-head or stock is very obvious.

This invention is to obviate the danger of breaking, and consists in putting around the brush-head or stock a circular band of rubber, in the form of a parallelogram or rhombus, with one of its angles projecting outward, and near the bristles or washing-material.

The brush-head is made of wood, or of suitable material, such as is commonly used for this purpose, in this class of brushes.

A groove is made in the brush-head or stock, near the bristles, so that it may present an even surface with the rubber, and in this groove is placed a circular rubber band. The band is made in the form of a parallelogram or rhombus, with one of its angles standing outward, so as to protect the glass, as seen in figs. 1 and 2, in the accompanying drawings; or it may be made in a triangular form, with one of its angles projecting, and cemented or otherwise fastened to the stock, so as to present a sharp angle outward, to protect the glass, as before mentioned.

It will be observed, that in constructing the brush-head, it is made in two parts. The part into which the bristles are to be inserted is screwed or fastened to the upper part, and the edge or rim of the part for bristles has a groove or furrow, with a sharp angle in the furrow, and the sides outward from the angle are slightly convex, so that the ring of rubber, fitting into the furrow, presents a sharp angle outward, as seen in the drawings, and the sides adjacent to the angle are slightly convex.

I am aware, that covering the ends of the wood of brooms and brushes with rubber, felt, and other soft material, is not new; also, that one Monzani, in England, in 1854, made application for a patent, in which he says: "This invention has for its object the application of vulcanized rubber, as an elastic material, on those parts of brushes and brooms which, in their use, are liable to be moved or struck against skirtings and other parts of buildings, and places or things which are to be dusted or cleaned thereby."

I do not claim either of the above inventions; but

What I claim as my invention, and desire to secure by Letters Patent, is—

The combination and arrangement of the head A, constructed as herein described, and provided with an angular groove or furrow around the lower side, with the rubber ring *a* fitting therein, as and for the purpose specified.

FRANCIS McLAUGHLIN.

Witnesses:
J. T. McLAUGHLIN,
J. L. NEWTON.